Figure 1:
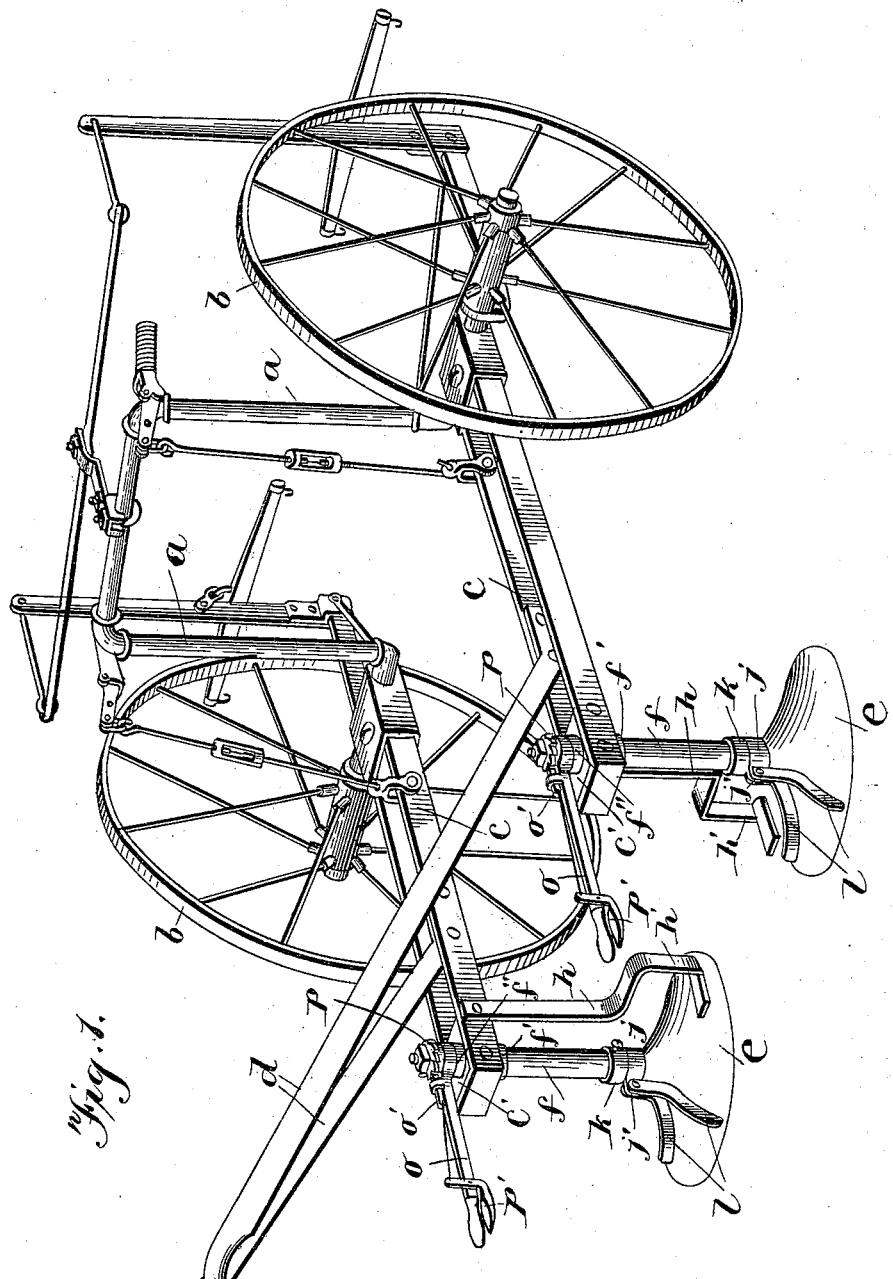

No. 607,632. Patented July 19, 1898.
E. E. WHIPPLE.
CULTIVATOR.
(Application filed Nov. 11, 1896.)
(No Model.) 3 Sheets—Sheet 1.

Witnesses
Geo. E. Frech
Chas. R. Wright

Inventor
Effinger E. Whipple.
by Hubert E. Peck
Attorney

No. 607,632.  
E. E. WHIPPLE.  
CULTIVATOR.  
(Application filed Nov. 11, 1896.)  
Patented July 19, 1898.
(No Model.)  
3 Sheets—Sheet 2.
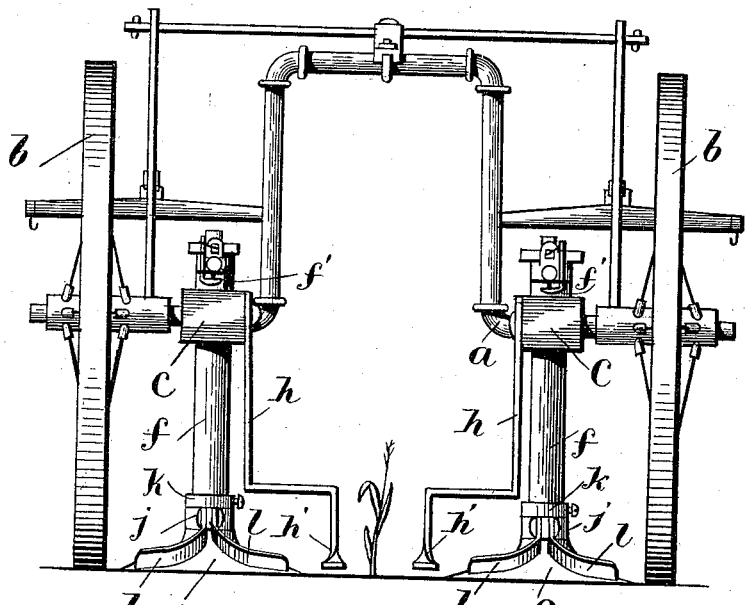
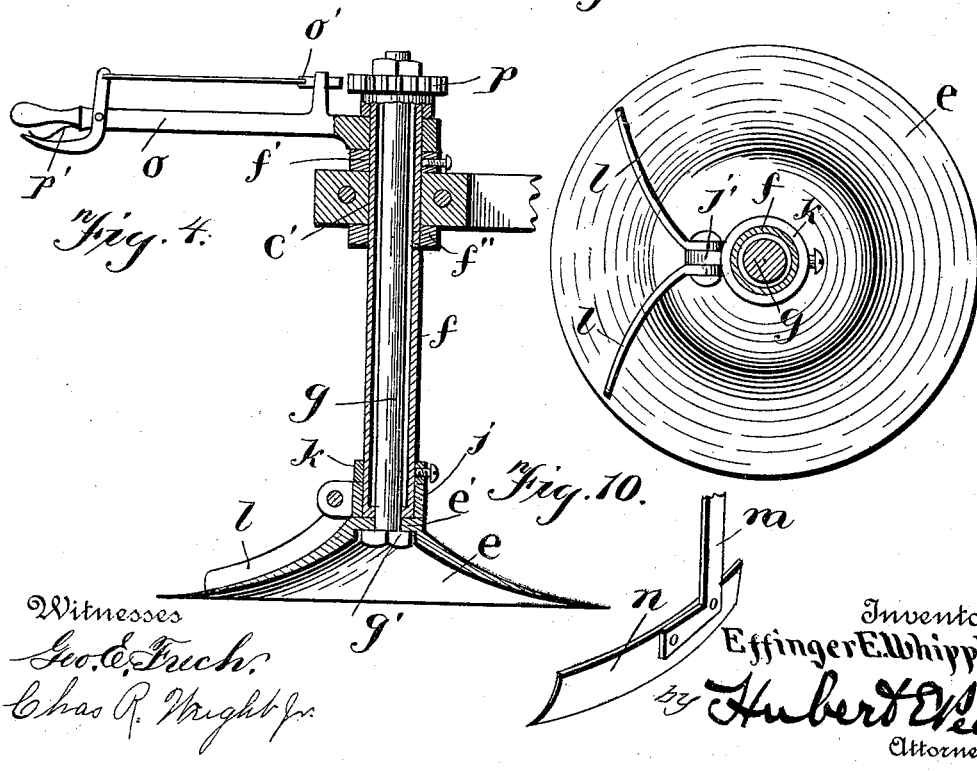
Witnesses  
Geo. E. Fuch.  
Chas. R. Wright Jr.
Inventor  
Effinger E. Whipple  
by Hubert E. Peck  
Attorney

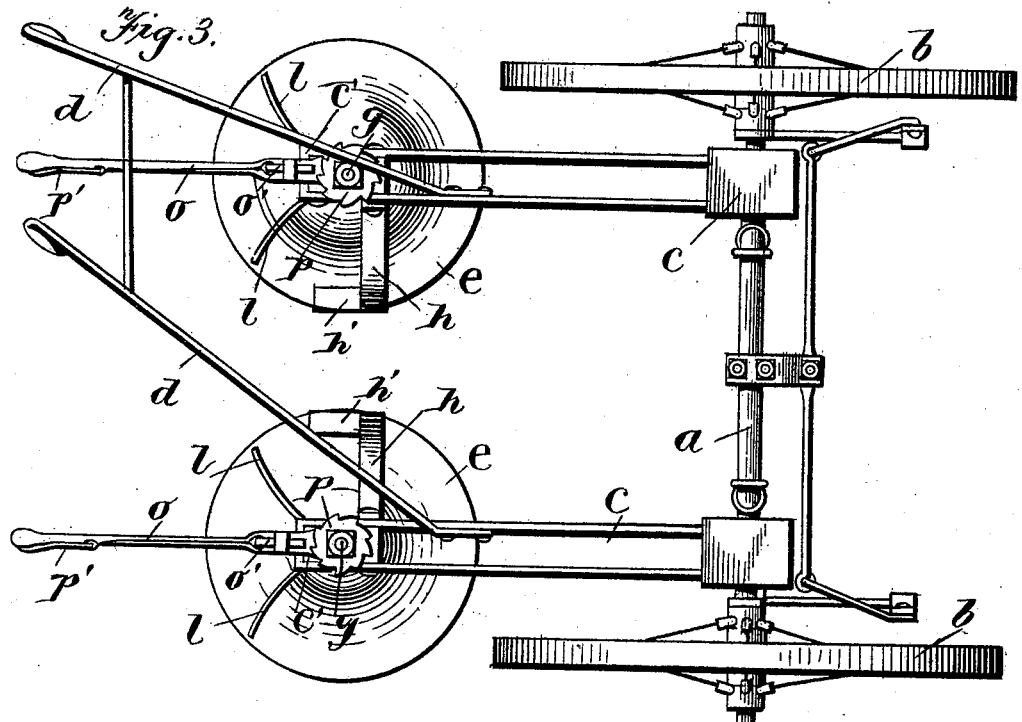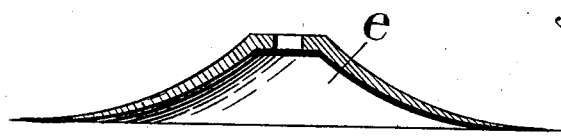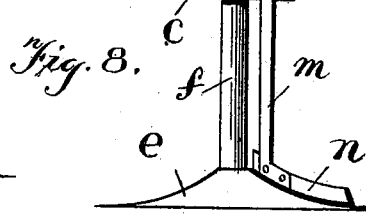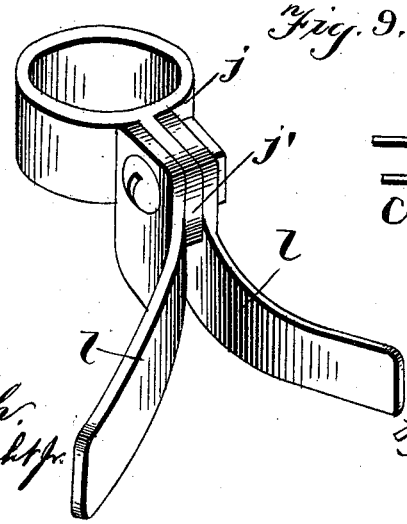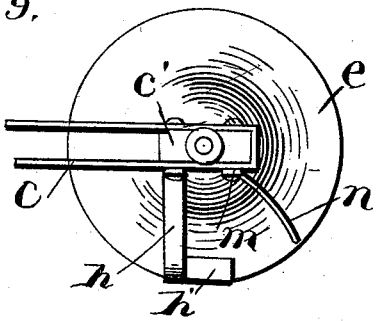

UNITED STATES PATENT OFFICE.

EFFINGER E. WHIPPLE, OF COOPERSTOWN, NEW YORK.

CULTIVATOR.

SPECIFICATION forming part of Letters Patent No. 607,632, dated July 19, 1898.

Application filed November 11, 1896. Serial No. 611,774. (No model.)

*To all whom it may concern:*

Be it known that I, EFFINGER E. WHIPPLE, a citizen of the United States, residing at Cooperstown, in the county of Otsego and State of New York, have invented certain new and useful Improvements in Cultivators; and I do hereby declare the following to be a full, clear, and exact description of the invention, such as will enable others skilled in the art to which it appertains to make and use the same.

This invention relates to certain improvements in corn-cultivators.

It is well known to those who have studied into the subject that the generally-employed methods of cultivating corn tend in a measure to retard full and complete growth and production of the cereal, simply because the soil-cultivating implements are so adjusted and arranged as to project and travel a considerable distance beneath the surface of the ground, and thereby disarrange, cut, and destroy a large percentage of the roots of the plant and turn over the moist soil to a considerable depth and expose it to the burning action of the sun. It is, in fact, difficult, if not almost impossible, to avoid these detrimental results when using the cultivating shovels, blades, &c., generally employed at the present time. The corn-plant from the time of sprouting begins to shoot out a great number of long and tender roots, which spread out close beneath the surface of the ground for a considerable distance around the stalk. As corn is an exceedingly rapid growing plant and must develop in something less than one hundred and fifty days, it is necessary to a full growth and production that the full, complete, and rapid root growth of each plant be undisturbed. An attempt has been made to meet these newly-recognized requirements in the cultivation of corn by providing long narrow blades or gophers to scrape along the top surface of the soil; but such devices will not operate satisfactory in trashy soil, nor will they always properly scour, nor will they always leave the surface of the soil in the proper condition.

The invention consists in certain novel features in construction and in combination and in arrangements of parts more fully and particularly pointed out and described hereinafter.

Referring to the accompanying drawings, Figure 1 is a perspective view of a cultivator embodying my improvements. Fig. 2 is a rear elevation of a portion of the machine, showing the disks in operative position on opposite sides of a hill of corn. Fig. 3 is a top plan view of the machine. Fig. 4 is a detail vertical sectional view through one of the disks and its standard. Fig. 5 is a top plan of a disk and its hiller and cleaner, the standard shown in section. Fig. 6 is a detail vertical section of a disk. Fig. 7 is a detail perspective view of the sleeve loose on the disk-standard and the two cleaners and hillers carried thereby. Figs. 8, 9, and 10 are detail views showing a modified arrangement of single cleaner and hiller for the rotary disk.

In the drawings the reference-letter $a$ is the axle of any suitable construction of cultivator-frame. The axle here shown is arched at the center, as usual, and provided with the supporting-wheels $b$ $b$ and suitable draft attachments, which can be connected to the axle or any other part of the frame, as my invention as hereinafter set forth is not limited to employment with any peculiar kind of a frame, but is generally adaptable.

$c$ $c$ are the two drag-bars, extending rearwardly and horizontally from the end portions of the axle and so connected therewith, preferably, as to permit independent vertical and lateral swing of each drag-bar; but they can be connected, if so desired, to swing together. Each drag-bar is provided with the rearwardly-extending handle $d$ to be grasped by the operator in controlling the lateral and vertical swing of the drag-bars and holding them in proper position with the cultivator-disks at work. The rear end or portion of each drag-bar is provided with a vertical bearing or opening $c'$, extending vertically through a journal-box therein. Each drag-bar is provided with a horizontally-arranged cultivating-disk $e$, having the vertical standard $f$ extending centrally from the upper side thereof and mounted to turn in and preferably extending above the bearing $c'$ of the drag-bar. The disk is preferably, although not necessarily, formed with a flat perforated central portion $e'$, and its vertical standard is formed of a tube $f$, at its lower end resting on said flat portion $e'$ and from thence extending upwardly, and at its upper end, above the drag-bar, closed, and a long bolt $g$ extends longitudinally through said standard and through the perforation in the center of the disk and beneath the disk is provided with a nut $g'$, which rigidly clamps the disk to the standard and locks the parts to rotate together—that is, the disk and standard. The upper end of the bolt passes through the closed upper end of the standard and has a head bearing on the upper side of said closed end. The standard is confined to turn freely in the drag-bar by any suitable means, as by the two adjustable exterior collars $f'\,f''$ thereon above and below the drag-bar.

The two disks in operation travel horizontally beneath the surface of the soil on opposite sides of a row of corn. Hence as the outer portions and cutting edges of the disks are hidden from view in the soil there might be danger of the operator permitting the disks to approach too closely to the corn and of cutting off the plants or roots thereof. To avoid such a difficulty, guards or indicators are provided above the surface of the ground to constantly locate the edge of each disk adjacent the row of plants. A convenient arrangement or construction of such a guard or indicator is shown as one specific means for carrying out this feature of my invention, wherein each drag-bar has a rod $h$ secured thereto adjacent the disk and extending downwardly and outwardly with its lower end $h'$ arranged immediately over the cutting edge of the disk and such a distance above the same as to be above the surface of the soil when the disk is at work beneath the same, whereby the operator is always informed as to the exact location of the cutting edge of the disk. The guard or indicator is arranged over the edge of the disk adjacent the row of plants, so that the two guards travel along close to and on opposite sides of the row of plants, substantially as shown in Fig. 2. Each disk is also provided with means to throw the earth toward or from the corn, as may be desired, and such means preferably, although not necessarily, constitute disk cleaners or scrapers. The preferred, although not the only, way of carrying out this feature of my invention consists in a sleeve $j$, loose on the lower end of the standard and resting on the center of the disk and loosely held in place by a collar $k$, clamped on the standard and having the arms or blades $l\,l$ at their upper forward ends bolted or otherwise secured to an ear $j'$, extending rearwardly from the sleeve $j$, loose on the standard. The blades $l\,l$ radiate rearwardly and laterally from the sleeve on the standard and preferably extend to the outer cutting edge of the disk and at their under edges are curved or shaped to engage and scrape the upper surface of the disk as it revolves, and thereby scour or clean the upper surface of the disk as it turns, while the blades are so flared or so radiate as to deflect the dirt and soil to each side of the disk as it moves forward and toward the rows of plants, whereby as the disk moves forward there is equal pressure on both blades in opposite directions, so that the blades are held against rotation with the disk and standard and are held in their proper positions in relation to the disk in its forward movement and notwithstanding its rotation. It will also be noticed that these blades as thus described constitute combined hillers and cleaners, although I do not wish to limit my invention to the employment of both a hiller and cleaner nor to the same element constituting both a hiller or dirt-thrower and cleaner.

In Figs. 8, 9, and 10 a modified arrangement is shown, wherein a shank $m$ is shown secured to and depending from the drag-bar and at its lower end provided with a combined dirt-thrower and disk-cleaner $n$, rigidly secured thereto and extending rearwardly at an angle over the surface of the disk to scrape the same and throw the dirt toward or from a single row of plants. The opposite disk should also be provided with a blade to throw the dirt toward or from the same row of plants, and in any case each disk is preferably provided with a hiller or dirt-thrower and a cleaner.

In some cases and in some soils the disks may not readily scour, so as to prevent ready rotation of the disks by reason of clogging and the adherence of soil and trash thereto. Hence means are provided, normally inoperative, whereby the standards and their disks can be forcibly turned by hand, bringing the cleaners into operation in scraping the soil, &c., from the disks. One method of carrying out this feature of my invention comprises a rearwardly-extending hand-lever $o$, having a sleeve or opening at its front end loosely surrounding the upper portion of the standard and resting on the collar $f'$ and arranged beneath a circular series of radial teeth or ratchets $p$, rigid with the upper part of the standard. This lever has a pawl $o'$, normally held out of engagement with the ratchet-teeth $p$ by the spring-clip $o''$, connected with the pawl, so that when the clip is pressed toward the handle of the lever the pawl will be pressed outwardly into engagement with the teeth, and the standard and disk can be rotated by force by swinging the lever back and forth on the principle of the ratchet-drill.

When the implement is in operation, under ordinary conditions the standards revolve freely in and independently of their hand-turning levers, which need be called into operation only in case of necessity.

Material advantages are attained by the peculiar shape and form of horizontally-disposed disk employed, which has the raised center, from which the disk slopes downwardly and outwardly to the outer sharp cutting edge forming the lowest portion on the disk, while the disk is slightly concave on its upper surface from the edge to the raised center, which will enter the ground in a manner similar to a plowshare and will throw or turn the soil like the moldboard of a plow. In fact, the shape of the disk where presented to the earth and from edge to center is of a plowshare shape with a rise at the center, say, of some three or four inches above the horizontal plane of the edge in a disk from twenty-one to twenty-four inches in diameter. Such a form of disk possesses material practical advantanges over a flat disk, which does not turn or sufficiently loosen the soil, or a vertically-elongated or bell-shaped disk, which roots through the ground with great draft and without turning the soil.

In operation the disks revolve freely by reason of friction with the earth as the implement is drawn forward and travel but a slight distance below the surface and above the surface roots of the plants, while each disk covers a comparatively wide furrow or stretch with a minimum amount of draft and yet thoroughly cultivates, loosens, and pulverizes the soil, so that the device constitutes a most advantageous and effective surface-cultivator.

My invention is not limited to a rotary nor to a circular disk arranged to travel horizontally just beneath the surface of the soil, and it should be noted that where I employ an indicator arranged to be visible above the ground and above the side or edge of a cultivator-tool traveling about horizontally beneath the surface of the soil such indicator is arranged above that portion of the tool nearest or adjacent the plants, and that if such indicator be employed with a tool having a central standard it could perform no function as such if only located centrally behind the rearmost edge of the disk or located only directly in rear of such standard.

While the various features of my invention are intended to be used in combination in the same tool, yet the invention is not so limited.

It is evident that various changes might be made in the forms, constructions, and arrangements of the parts described without departing from the spirit and scope of my invention. Hence I do not limit myself to the exact constructions here shown or described, but consider myself entitled to all such modifications and variations as fall within the spirit and scope of my invention.

Having thus fully described my invention, what I claim as new, and desire to secure by Letters Patent of the United States, is—

1. In a cultivator, the combination of a vertical turnable standard, a support therefor, a horizontally-disposed cultivator-disk on the lower end of the standard, a scraper, or cleaner on or above the top surface of the disk, and a lever mounted loosely on the standard and having a pawl-and-ratchet connection therewith to rotate the standard and disk when the lever is swung, and thereby cause the cleaner to scour the top surface of the disk.

2. In a cultivator, the combination of a standard, a support, a horizontally-disposed disk rigid on the lower end of the standard, a sleeve loose on the standard above the disk, and two blades or arms extending from the sleeve laterally and outwardly over the disk, substantially as described.

3. In a cultivator, a horizontally-disposed disk or tool arranged to travel just beneath the surface of the soil, in combination with two blades or arms independent of the disk and arranged at the top surface thereof and extending rearwardly, and laterally in different directions, substantially as described.

4. In a cultivator, the combination of a horizontally-disposed disk arranged to travel just beneath the surface of the soil, with means arranged immediately above the disk to throw the soil laterally, substantially as described.

5. In a cultivator, the combination of a movable drag-bar having a handle, a vertically-disposed standard depending therefrom, a horizontally-disposed approximately flat disk on the lower end of the standard and arranged to travel beneath the surface of the soil, and an indicator bar or device, depending from the drag-bar, with its indicating or pointing end or portion over the outer side cutting edge of the disk and a distance above the same, thereby moving above the soil and enabling the operator to always accurately locate said buried edge of the disk and prevent the same cutting the plants.

6. In a cultivator, the combination of a bar, a vertical turnable standard carried thereby, a horizontal cultivator-disk rigid on the lower end of the standard, a ratchet-wheel rigid on the standard, a lever loose on said standard beside said wheel, and a pawl carried by the lever to engage said wheel and thereby rotate the standard as the lever is swung or oscillated, substantially as described.

7. In a cultivator, a part thereof laterally movable by hand and a cultivator blade or tool carried thereby and arranged to move horizontally beneath the soil, in combination with an indicator arranged above the edge or portion of the tool adjacent the plants, thereby pointing out to the operator the location of said buried edge when in operation and enabling him to move the parts to avoid cutting or disturbing the plants.

8. In a cultivator, the combination of a cultivator blade or tool arranged to extend beneath the surface of the soil approximately horizontally, with an indicator arranged over the edge or portion of the blade adjacent the plants, substantially as described.

9. In a cultivator, the combination of rearwardly-extending movable drag-bars, horizontally-disposed cultivating-tools, such as disks, carried thereby and arranged to travel beneath the soil between the rows of plants, and indicators moving with the drag-bars and arranged over the side edges of said tools adjacent the plants, whereby the visible indicators point out to the operator the location of those portions of the buried edges of the tools nearest the plants, substantially for the purpose stated.

10. In a cultivator, the combination of movable portions provided with handles, depending standards, horizontally-disposed cultivating-disks carried by the standards and arranged to travel beneath the surface of the soil at opposite sides of a row of plants, and the indicators for the disks, respectively, said indicators visible above the ground over the adjacent portions of the edges of the disks which portions of the edges are nearest the plants.

11. In a cultivator, the combination of a wheeled frame, laterally-movable drag-bars, standards depending from the drag-bars, horizontally-disposed circular disks on the lower ends of the standards and arranged to travel horizontally beneath the soil on opposite sides of the plants, and indicator bars or devices pointing out or locating the portions of said disks nearest the plants, each indicator moving with and depending from a drag-bar to a point to one side of the standard (in the line of draft) and over that portion of the disk nearest the plants, substantially as described.

12. In a cultivator, a cutting or cultivating tool disposed horizontally and arranged to move horizontally beneath the soil, and provided with an indicator above the soil and movable laterally therewith and ending above and pointing out the outer lateral extremity or portion of the edge of said tool between or intermediate the front and rear extremities or portions thereof, substantially as described.

13. In a cultivator, a circular rotary horizontally-disposed disk arranged to move beneath the soil in combination with a visible indicator above and locating the edge of said disk adjacent the plants, and a blade or arm above and conforming to the top surface and approximately radial of said disk, substantially as described.

14. In a cultivator, a horizontally-disposed disk having a central upwardly-extending standard, said disk approximately flat to travel beneath the soil, and a horizontally-disposed blade independent of and conforming to the top surface of the disk and extending from approximately the central portion thereof laterally about to the edge of the disk so that the soil slides on the top of the disk along said blade and past the outer end thereof, substantially as described.

15. In a cultivator, supporting means, and a horizontally-arranged cultivating-disk centrally secured, said disk formed approximately flat with a slightly-raised center, the top surface of the disk slightly concaved from the center to the edge which forms the lowest portion of the disk, whereby the concavity of the approximately flat disk from the raised center acts as the moldboard of a plow in turning out the soil while the disk moves horizontally just beneath the surface, substantially as described.

16. In a cultivator, a horizontally-disposed disk arranged to travel beneath and loosen the soil, a cleaner or scraper such as a blade adjacent and coacting with the surface of said disk, and lever means for positively turning said disk, thereby enabling the cleaner to scour the same, substantially as described.

17. In a cultivator, the combination of a horizontally-disposed approximately circular rotary disk having a central vertical support, whereby the disk travels horizontally just beneath the surface of the soil, and a blade or arm arranged at the top surface of the disk and extending rearwardly from about the center thereof laterally toward the portion thereof adjacent the plants so as to engage and deflect the thin layer of soil on the top surface of the disk as the same moves forward beneath the surface of the soil.

18. In a cultivator, a vertical standard, an approximately circular rotary disk attached at or about its center to said standard, said disk approximately flat with a raised center and a slight drop from the center to the surrounding edge, the top surface concaved radially between said center and edge to turn the earth as the disk moves horizontally just beneath the surface of the soil, and an arm or blade arranged on and approximately radially of said top surface of the disk, and conforming to the concavity thereof and extending about to the edge thereof.

19. In a cultivator, a horizontally-disposed cultivator-disk arranged to travel horizontally beneath the surface of the soil, in combination with a hiller arranged about horizontally above the disk to throw the earth loosened thereby laterally, substantially as described.

20. In a cultivator, a horizontally-disposed rotary approximately circular cultivator-disk arranged to travel horizontally just beneath the surface of the soil, in combination with a combined hiller and scraper arranged at the top surface of the disk, substantially as described.

21. In a cultivator, a disk or blade arranged to travel beneath the surface of the soil, in combination with opposing arms or blades above the same whereby the lateral or side pressure on the disk or blade and its carrier is equalized, substantially as described.

22. In a cultivator, a laterally-movable member, such as a drag-bar, a standard depending therefrom, a horizontally-disposed disk or blade carried thereby and arranged to travel within the soil, and soil-engaging means or member above said disk and equalizing the lateral thrust or side pressure of the soil on the disk and standard, substantially as described.

In testimony whereof I affix my signature in presence of two witnesses.

EFFINGER E. WHIPPLE.

Witnesses:
FENNIMORE O. WHIPPLE,
HANNAH M. WHIPPLE.